(12) United States Patent
Welschof

(10) Patent No.: US 6,171,196 B1
(45) Date of Patent: Jan. 9, 2001

(54) VL JOINT FOR A PROPELLER SHAFT WITH AN OPTIMIZED CRASH BEHAVIOR

(75) Inventor: Hans-Heinrich Welschof, Rodenbach (DE)

(73) Assignee: GKN Lobro GmbH (DE)

( * ) Notice: Under 35 U.S.C. 154(b), the term of this patent shall be extended for 0 days.

(21) Appl. No.: 08/990,010

(22) Filed: Dec. 12, 1997

(30) Foreign Application Priority Data

Dec. 14, 1996 (DE) .............................................. 196 52 100

(51) Int. Cl.$^7$ ....................................................... F16D 3/16
(52) U.S. Cl. .......................................... 464/146; 464/906
(58) Field of Search ..................................... 464/140, 141, 464/142, 143, 145, 146, 162, 906, 179

(56) References Cited

U.S. PATENT DOCUMENTS

| | | | | |
|---|---|---|---|---|
| 3,069,874 | * | 12/1962 | Leto ....................................... | 464/146 |
| 3,162,024 | * | 12/1964 | Breuer et al. ......................... | 464/146 |
| 3,789,626 | * | 2/1974 | Girguis .............................. | 464/906 X |
| 5,582,546 | * | 12/1996 | Welschof .............................. | 464/141 |
| 5,795,233 | * | 8/1998 | Eschbach et al. ............... | 464/906 X |

* cited by examiner

Primary Examiner—Lynne H. Browne
Assistant Examiner—Greg Binda

(57) ABSTRACT

A VL constant velocity universal joint for accommodating axial displacements in a propeller shaft of a motor vehicle and for connecting a drive unit to a rear axle gearbox has at least two articulatably connected shaft portions, with a standard plunge which is usable in a damage-free way. An outer joint part has outer ball tracks and an inner joint part has inner ball tracks. A plurality of torque transmitting balls are guided in the outer and inner ball tracks associated with one another. Associated outer ball tracks and inner ball tracks form angles of intersection with respect to a central axis A of the joint. The angles are of identical size but set in opposite directions. A ball cage is provided with a plurality of cage windows each accommodating one of the balls and which hold the balls in one plane when the joint is axially displaced or articulated. The outer joint part is connected to an annular flange and the inner joint part to a connecting shaft, wherein when the outer joint part is displaced relative to the inner joint part, the effective guiding length of the ball tracks in one of the two joint parts is shorter than that of the ball tracks in the other one of the two joint parts. Stop means are provided which become effective at the end of the standard plunge to prevent the balls from leaving the ball tracks with the shorter length. The stop means comprise nominal deformation means which are deformable when the standard plunge is exceeded.

3 Claims, 5 Drawing Sheets

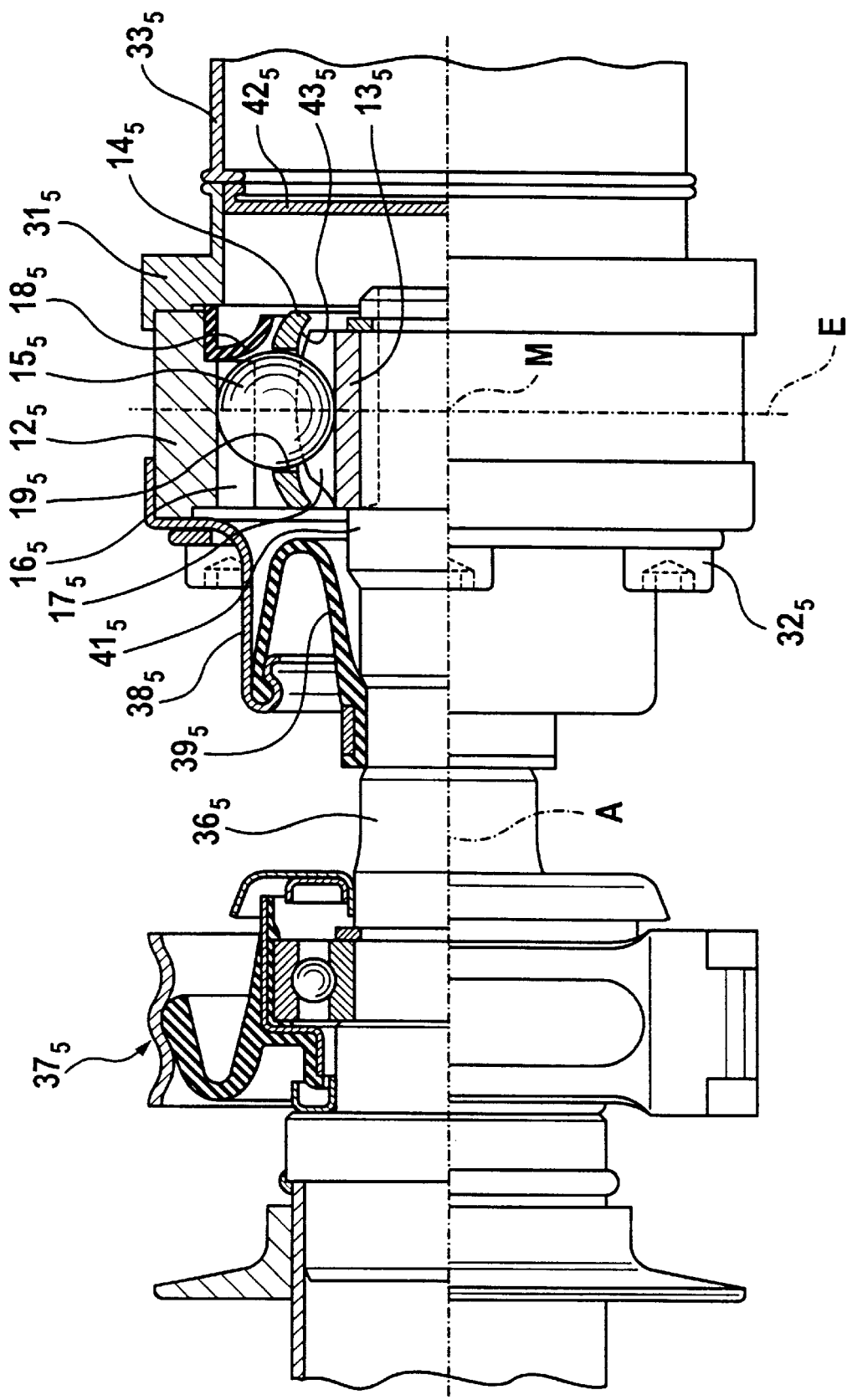

VL JOINT FOR A PROPELLER SHAFT WITH AN OPTIMIZED CRASH BEHAVIOR

BACKGROUND OF THE INVENTION

The invention relates to a VL constant velocity universal joint for accommodating axial displacements in a propeller shaft of a motor vehicle and for connecting a drive unit to a rear axle gearbox, having at least two articulatably connected shaft portions, a standard plunge usable in a damage-free way, an outer joint part with outer ball tracks, an inner joint part with inner ball tracks, a plurality of torque transmitting balls each guided in outer and inner ball tracks associated with one another, with associated outer ball tracks on the one hand and inner ball tracks on the other hand, forming angles of intersection in respect of the central axis A of the joint, which are of identical size but are set in opposite directions, and having a ball cage which is provided with a plurality of cage windows each accommodating one of the balls and which hold the balls in one plane when the joint is axially displaced or articulated, with the outer joint part having to be connected to an annular flange and the inner joint part to a connecting shaft.

Propeller shafts of this type are used in motor vehicles to transmit torque from a front drive unit to the rear axle. Apart from having to ensure functional safety under normal operating conditions, these structures also have to fulfil certain requirements in the case of a vehicle crash wherein the front part of the vehicle and thus the first part of the propeller shaft is displaced towards the rear axle. To prevent the shaft from kinking towards the vehicle cell and in order not to prevent a greatest possible absorption of energy in the front part of the vehicle through deformation work, by supporting the drive unit at the rear axle, and to avoid any damage to the rear axle, it must be possible to shorten the shafts further beyond the range predetermined by the standard plunge of the VL joint with a minimum of energy being absorbed. The component particularly suitable for accommodating such shortening is the respective axially plungeable constant velocity universal joint in the propeller shaft.

Propeller shafts of this type for motor vehicles are known from DE 42 24 201 C2 wherein it is proposed that at the end of the predetermined standard plunging distance between the outer joint part and the inner joint part, the balls of the cage stop against the annular flange and that the connection between the plug-in shaft and the inner joint part is to be destroyed. Hereafter, the plug-in shaft slides into the annular flange and into the hollow shaft adjoining same. This embodiment presupposes plug-in shafts which, with a reduced diameter, follow the toothed region engaging a correspondingly toothed region in the inner joint part.

DE 43 44 177 C1 describes a similar type of propeller shaft for motor vehicles, which comprises a cage-less joint with axis-parallel ball tracks, which cage-less joint, in operation, is suitable for very small articulation angles only. With this embodiment, the plug-in shaft cannot be slid in beyond the predetermined standard plunging region unless the outer joint part and the adjoining tubular shaft are deformed, thus absorbing a large amount of energy.

SUMMARY OF THE INVENTION

It is the object of the present invention to provide a VL constant velocity universal joint for a propeller shaft of a motor vehicle, which joint, after the predetermined standard plunging distance has been exceeded, is destructible with only a small amount of energy being absorbed and which, in an non-obstructive way, permits the plug-in shaft to be inserted further along a considerable length towards the annular flange.

The objective is achieved in that, when the outer joint part is displaced relative to the inner joint part, the effective guiding length of the ball tracks in one of the two joint parts, in the sense of shortening the propeller shaft, is shorter than the effective guiding length of the ball tracks in the other one of the two joint parts; that there are provided stop means which become effective at the end of the standard plunging path to prevent the balls from leaving the ball tracks with the shorter guiding length; and that the stop means comprise nominal deformation means which are deformable when the standard plunging path is exceeded.

The effect of these measures consists in that, after a predetermined standard plunging length has been exceeded, there first become effective stop means which prevent unintended dismantling during transport and assembly and which, without suffering any damage, limit any drive unit displacement relative to the rear axle drive, such displacement occurring in service under extreme service loads. In the case of loads exceeding the aforementioned loads, which only occur as a result of deformation suffered by the front part of the vehicle in an accident, the nominal deformation means are destroyed. Thereafter, with only slight resistance forces having to be overcome, the balls are caused to leave the ball tracks of one of the two joint parts so that axial forces can non longer be supported by the propeller shaft and the transmission of torque ceases immediately. This means that the propeller shaft can be shortened further while absorbing only small amounts of energy.

According to first preferred embodiments it is proposed that, starting from a central plane of the joint, the inner ball tracks at the shaft connection end are shorter than the outer ball tracks at the annular flange end or the outer ball tracks at the annular flange end are shorter than the inner ball tracks at the shaft connection end.

In these embodiments, there are provided stop means which, as nominal deformation means, have to be deformed or destroyed before the balls are able to leave the ball tracks. The stop means can be provided directly at the ends of the respective shorter ball tracks, for example in the form of annular members arranged between the connecting shaft and the inner joint part or the outer joint part and the annular flange or they can be provided locally independently of the shorter ball tracks in the form of a cover which is inserted into the annular flange or the adjoining tubular shaft and against which there stops the inner joint part and, respectively, a front end of the connecting shaft inserted into same.

According to a second embodiment it is proposed that the inner ball tracks in the inner joint part comprise track end portions consisting of an elastically resilient or easily plastically deformable material and that in the circumferential direction, the cage windows form fixed end stops for the balls when these reach the track end portions. When, by reaching the fixed end stops in the cage windows, the balls are prevented from moving further in the circumferential direction and thus from being displaced further along the ball tracks extending at an angle of intersection, axially moving the balls out of said ball tracks while deforming the track end portions is achieved. In this embodiment, said track end portions form the destructible nominal deformation means of the stop means, i.e. in this case, too, the effective guiding length of one of the joint parts is reduced. The plasticity of the track end portions can be achieved by doing without hardening the respective joint parts in this region.

The annular members which serve as nominal deformation means may consist of plate metal rings or plastic rings. The annular elements may optionally cooperate with the balls or with the cage. By providing the annular elements or cover parts in the annular flange with a suitable design, it is possible to set the absorption of a defined amount of energy after the dismantling of the joint, while shortening the propeller shaft further, provided this is desirable as an additional measure towards the absorption of energy in the front part of the vehicle in the case of a vehicle accident. The cover parts can also be used as means additional to the second embodiment.

Fixed stops can be provided at the ends of the respective longer ball tracks. Alternatively, it is possible to provide axial stops between the inner joint part and the ball cage. As a result, even if the connecting shaft is pushed further into the annular flange, the balls, after having left the shorter ball tracks, are held at the ends of the longer ball tracks, while being radially supported on an adjoining shaft shank or in an adjoining hollow shaft.

Modifications of the above within the limits of the respective technical know-how are possible. Special embodiments are defined in the subclaims, with reference being made here to the contents of the subclaims.

BRIEF DESCRIPTION OF THE DRAWINGS

Preferred embodiments of the invention will be described below with reference to the drawings wherein

FIG. 5 shows an inventive joint with outer tracks with a shortened guiding length in a first embodiment comprising a plastic ring in front of the annular flange, which ring forms a stop and nominal deformation element.

BRIEF DESCRIPTION OF A PREFERRED EMBODIMENT

Figure 1:
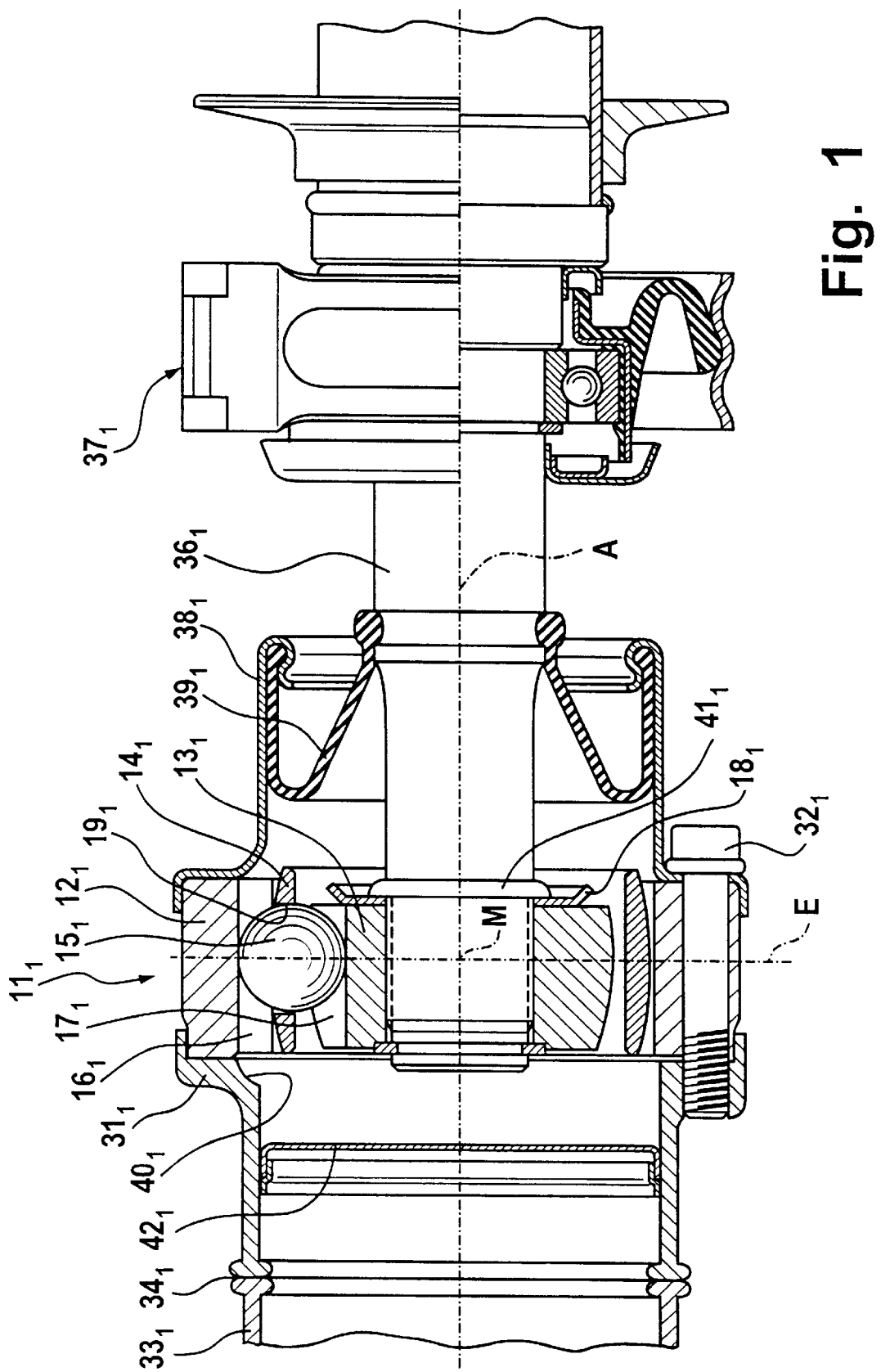
FIG. 1 shows in inventive joint with inner tracks with a shortened guiding length in a first embodiment comprising a plate metal ring on the shaft journal, which ring constitutes a stop and nominal deformation element.

To the extent that the designs of the inventive assemblies correspond to one another, FIGS. 1 to 5 will be described jointly below. A constant velocity universal joint 11 comprises an outer joint part 12, an inner joint part 13, a ball cage 14 and torque transmitting balls 15 each held in a cage window 19. The joint 11 is an axially plungeable VL constant velocity universal joint whose details are provided with the respective reference numbers in the individual Figures. The outer and inner tracks 16, 17 which are associated with one another, with one of each, jointly, carrying a ball 15, extend, as is known in itself, at angles of intersection relative to the joint axis A, which angles are of equal size, but face opposite directions. As a result, in the case of relative displacement movements between the outer joint part 12 and the inner joint part 13, the cage 14 with the balls 15 is guided on to half the displacement path relative to each of the two joint components 12, 13. The outer joint part 12 is connected to an annular flange 31 which is flanged to the outer joint part by means of bolts 32. The annular flange is followed by a hollow shaft 33, with the hollow shaft 33 according to FIGS. 1 to 4 being connected to the annular flange 31 by means of a friction weld 34. Into the inner joint part 13 there is inserted a connected shaft 36 which, at a certain distance from the joint, is supported by an elastic shaft bearing 37. A plate metal cap 38 is secured to the outer joint part by means of bolts 32. A rolling boot 39 seals the plate metal cap 38 relative to the connecting shaft 36.

In FIG. 1, the inner ball tracks $17_1$, with reference to a central joint platen E, are so short at the plug-in shaft end that, when the plug-in shaft $36_1$ is slid in towards the annular flange $31_1$, the balls lose their guidance in the inner ball tracks $17_1$ at the shaft connection end before the same situation can arise in the outer ball tracks $16_1$ at the annular flange end. This, in any case, is prevented in that in the annular flange $31_1$, an end stop $40_1$ for the balls $15_1$ limits a further insertion of the balls $15_1$ and the cage $14_1$ towards the annular flange $31_1$. As a result of this measure, the balls at the ends of the inner ball tracks $17_1$ are caused to stop against a plate metal ring $18_1$ which is secured between the inner joint part $13_1$ and an annular collar $41_1$ on the shaft shank $36_1$. On the one hand, the ring $18_1$ forms the stop means, with its purpose being to prevent the joint from being lost prior to assembly, and on the other hand, in the mounted condition of the joint as illustrated, the ring $18_1$ serves as an easily destroyable nominal deformation element which, when the plug-in shaft $36_1$ is inserted further into the annular flange $31_1$, permits the joint to be dismantled so that it can no longer accommodate any axial forces and can no longer transmit any torque. Any further insertion of the plug-in shaft $36_1$ into the annular flange $31_1$ is prevented by a plate metal cover $42_1$ which cannot be displaced by the plug-in shaft $36_1$ towards the hollow shaft $33_1$ unless slightly increased friction forces are overcome. However, the primary function of the cover $42_1$ is to seal the joint towards the outside, i.e. towards the hollow shaft $33_1$.

Figure 2:
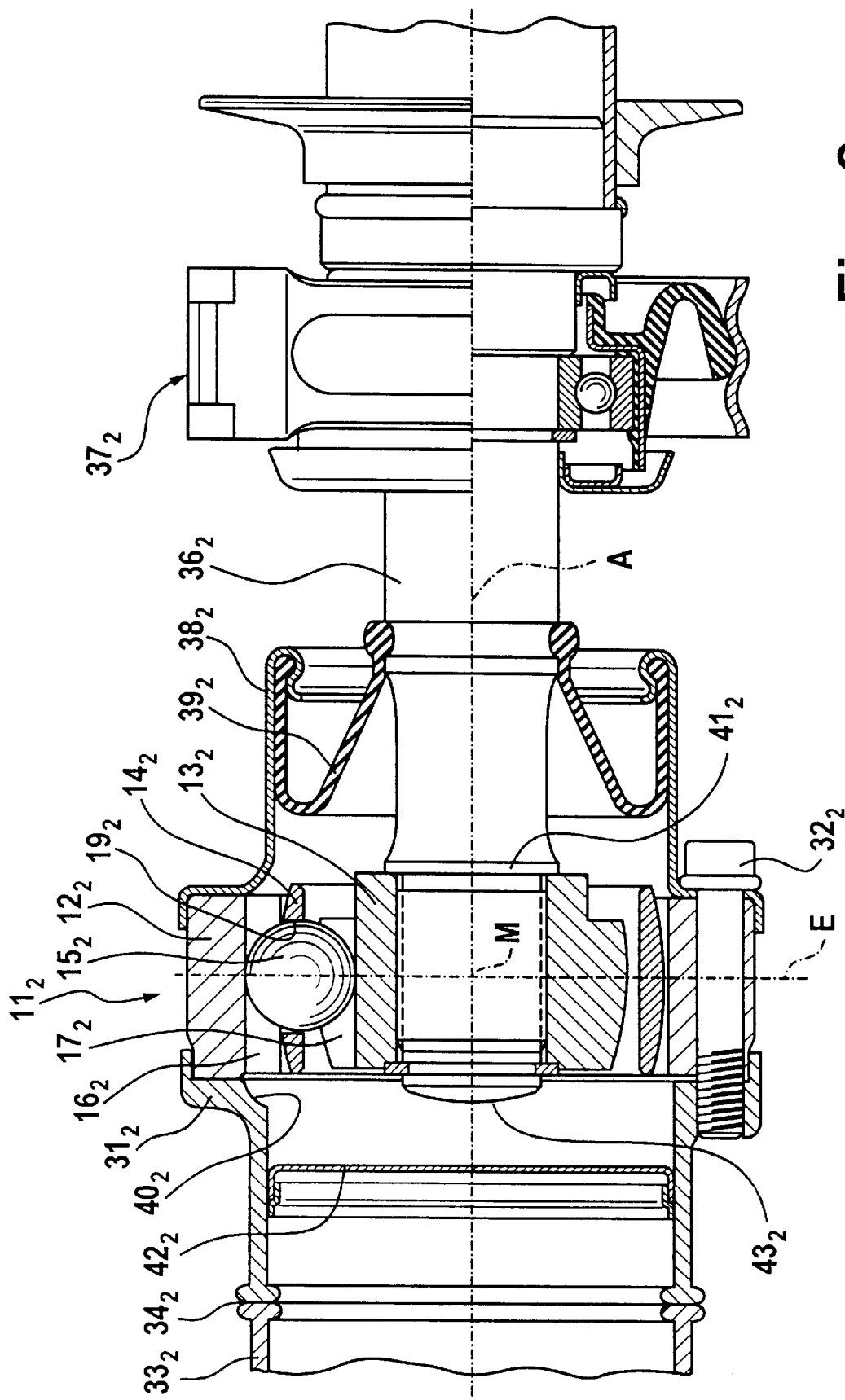
FIG. 2 shows an inventive joint with inner tracks with a shortened guiding length in a second embodiment comprising a cover in the annular flange, which cover constitutes a stop and nominal deformation element.
Figure 3:
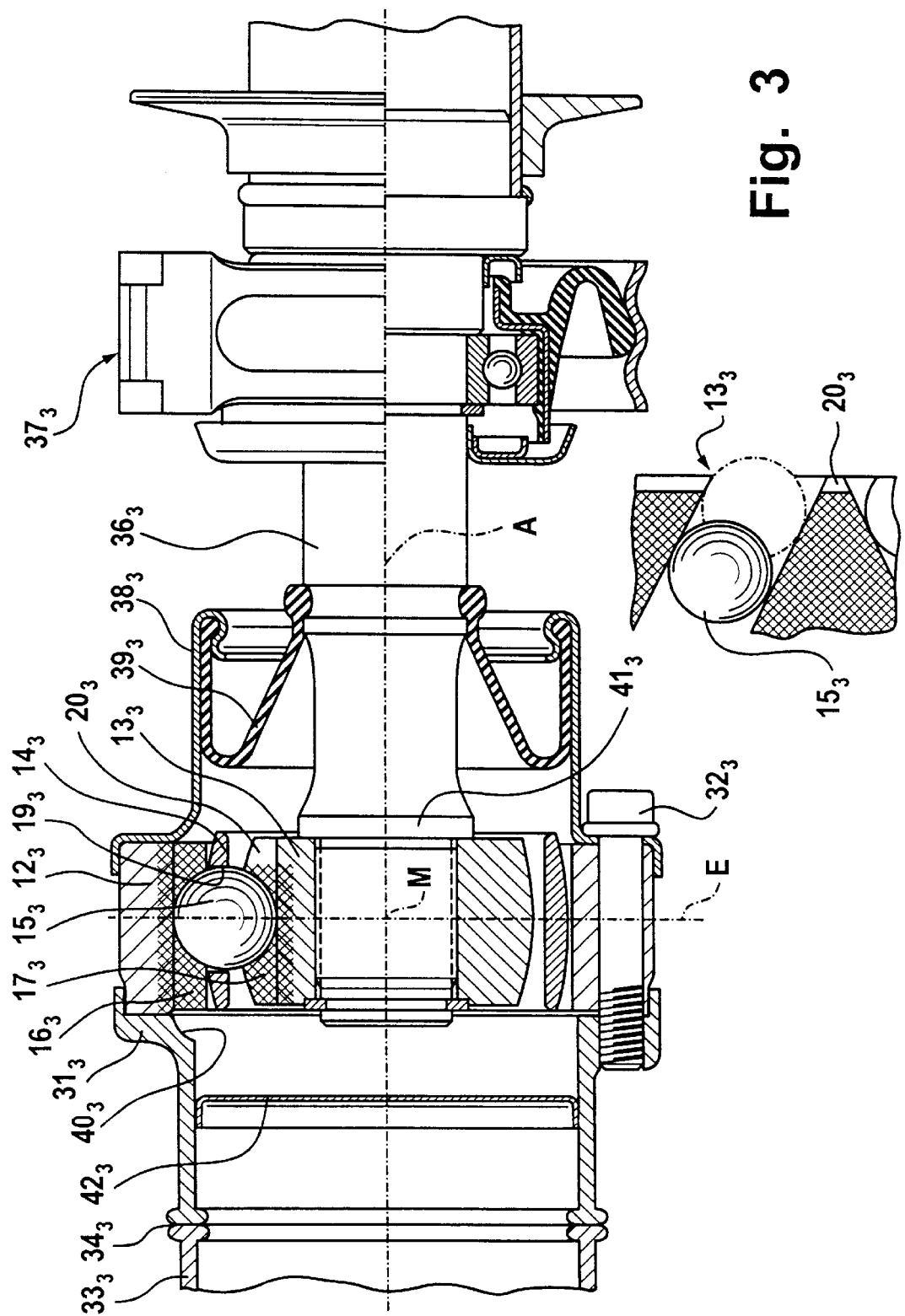
FIG. 3A shows an inventive joint with inner tracks with a shortened guiding length in a third embodiment comprising track ends consisting of a resilient material, which track ends form nominal deformation elements of the stop elements.
FIG. 3B shows the ball.

FIG. 2 shows a joint which largely corresponds to the joint illustrated in FIG. 1. However, it deviates from FIG. 1 in that it does not comprise a part which corresponds to the plate metal ring 18 shown in FIG. 1. The function of the stop means and of the nominal deformation means is fulfilled entirely by the cover $42_2$ which cooperates with the spherical end $43_2$ of the connecting shaft $36_2$ in such a way that articulation movements can take place in the point of contact without the position of the joint center M being adversely affected. Otherwise, all details in FIG. 2 correspond to those in FIG. 1.

The joint illustrated in FIGS. 3A and B largely corresponds to that shown in FIGS. 1 and 2. However, it deviates from FIGS. 1 and 2 in that, with reference to the central joint plane E, the length of the inner ball tracks $17_3$ at the plug-in shaft end is identical to that of the outer ball tracks $16_3$ at the annular flange end. The cross-hatched areas which include the cross-sectional area and the surface area, indicates that the material of the ball tracks has been hardened. It can be seen that the inner ball tracks $17_3$ comprise unhardened track end regions $20_3$ which limit the effective guiding length of the inner ball tracks $17_3$ to the hardened parts. For this purpose, there has to be provided a ball cage $14_3$ whose cage windows are so short in the circumferential direction that the balls $15_3$ are prevented from entering the unhardened end regions $20_3$ in the direction of the angles of intersection of the ball tracks. In this way, the end regions become destroyable stop elements in that the balls $15_3$ are axially pulled out of the inner joint part $13_3$ in the position as held in the circumferential direction. The illustrated cover $42_3$ in the annular flange $31_3$ primarily serves to seal the joint towards the outside in the direction of the tubular shaft $33_3$.

Figure 4:
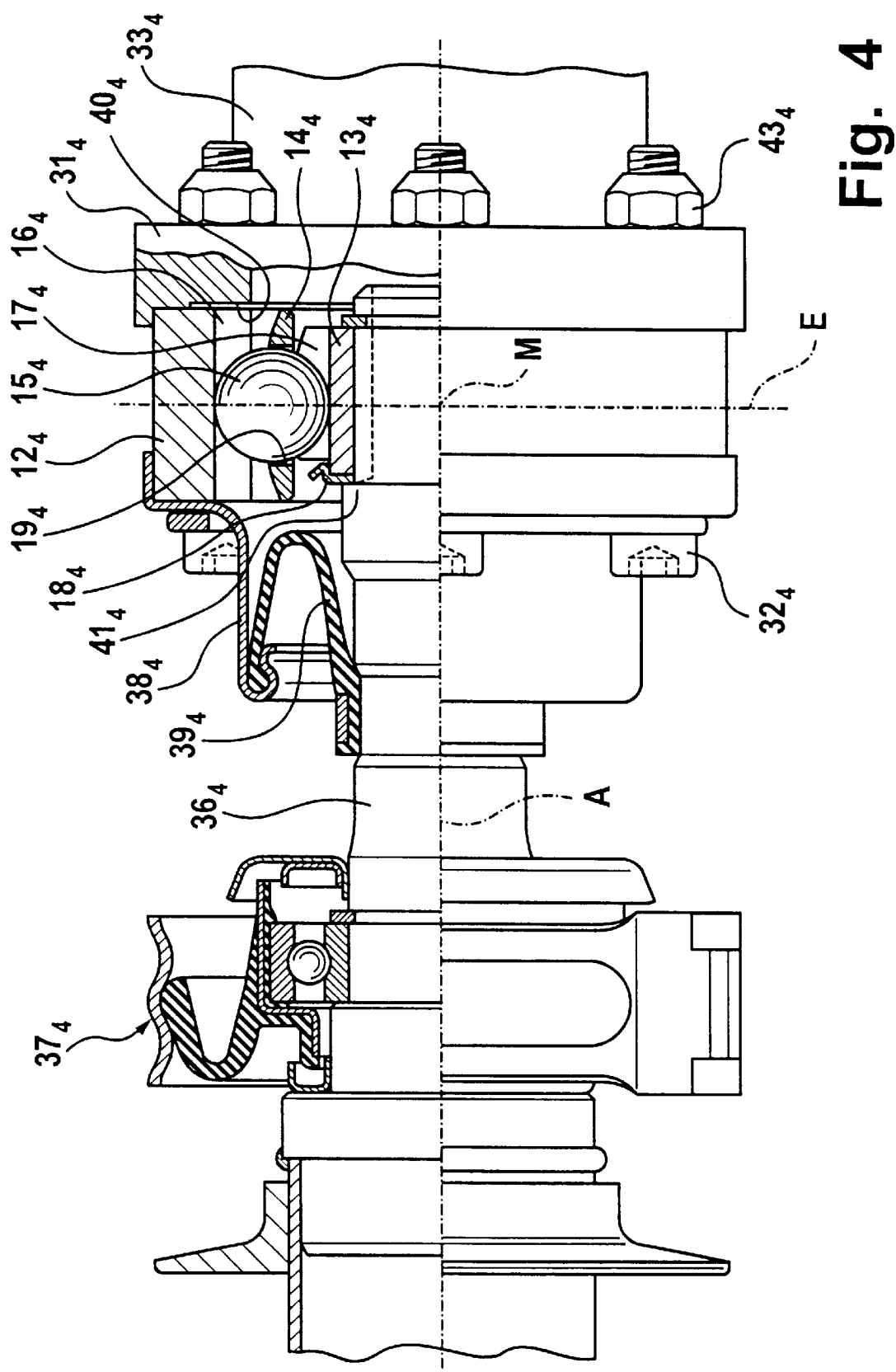
FIG. 4 shows an inventive joint with inner tracks with a shortened guiding length in a fourth embodiment comprising a plate metal ring on the shaft journal, which ring constitutes a stop and nominal deformation element.

FIG. 4 shows a joint which, while being modified in respect of its individual parts and its function, fully corresponds to the joint shown in FIG. 1. Only the shape of the plate metal ring $18_4$ is different, which is clamped on to the inner joint part $13_4$ so as to be self-holding and which, even prior to the assembly of the joint, serves to prevent the joint from being lost. The shape of the annular flange $31_4$ also differs, both in respect of the flange as a whole and especially in respect of the end stop $40_4$ for the balls $15_4$. In this embodiment, the bolts $32_4$ are secured by nuts $43_4$. The functions correspond to those described with reference to FIG. 1.

FIG. 5 shows a joint whose design is similar to that shown in FIG. 4. However, with reference to the central joint plane E, the ball tracks $16_5$ in the outer joint part $12_5$ at the annular flange end are shorter than the ball tracks $17_5$ in the inner joint part $13_5$ at the connecting shaft end. Between the outer joint part $12_5$ and the annular flange $31_5$ there is clamped in a plastic ring $18_5$ which constitutes the stop means, which prevents the joint from being lost prior to assembly and which serves as a nominal deformation element in the mounted condition. While the plug-in shaft $36_5$ is inserted into the annular flange $31_5$, the ring $18_5$ can easily be deformed or destroyed, so that the balls $15_5$ leave the tracks $16_5$ in the outer joint part before they leave the tracks $17_5$ in the inner joint part $13_5$. This, incidentally, is prevented by the stop of the inner joint part $13_5$ and an inner stop face $43_5$ of the ball cage $14_5$. A plate metal cover $42_5$ inserted into the annular flange $31_5$ again serves to seal the joint towards the outside in the direction of the tubular shaft $33_5$. When inserted into the plug-in shaft $36_5$ it is also able to accommodate additional deformation or friction forces. The gap between the outer joint part $12_5$ and the annular flange $31_5$ is sealed by the plastic ring $18_5$.

A worker in this art would recognize these embodiments are only examples, and that other modifications come within this invention. Thus, the claims should be studied to determine the true scope and content of this invention.

What is claimed is:

1. A constant velocity universal joint for accommodating axial displacements in a propeller shaft of a motor vehicle and for connecting a drive unit to a rear axle gearbox comprising:

at least two articulatably connected shaft portions;

a standard plunge which is usable in a damage-free way;

an outer joint part with outer ball tracks;

an inner joint part with inner ball tracks, a plurality of torque transmitting balls each guided in one of said outer and inner ball tracks associated with one another, with associated outer ball tracks on the one hand and inner ball tracks on the other hand forming angles of intersection in respect of a central axis (A) of said joint, said angles being of identical in size but set in opposite directions wherein with reference to a central joint plane, said inner ball tracks of said inner joint part are shorter than said outer ball tracks of said outer joint part; and a ball cage provided with a plurality of cage windows each accommodating one of said balls and which hold said balls in one plane when the joint is axially displaced or articulated, with said outer joint part having to be connected to an annular flange and said inner joint part to a connecting shaft; wherein, when said outer joint part is displaced relative to said inner joint part, the effective guiding length of said ball tracks in one of said two joint parts is shorter than that of said ball tracks in the other one of said two joint parts and stop means are provided to prevent said balls from leaving said ball tracks with said shorter guiding length; and said stop means have nominal deformation means which are deformable by said balls, wherein said nominal deformation means are formed by an annular element which is secured at said inner joint part at the connection shaft and which cooperates with said balls.

2. A joint according to claim 1, wherein said annular element is made of plate metal.

3. A joint according to claim 1, wherein said annular element is made of a plastic.

* * * * *